United States Patent
Wild et al.

(10) Patent No.: US 11,988,638 B2
(45) Date of Patent: May 21, 2024

(54) MEASURING SYSTEM FOR MONITORING THE MATERIAL PARAMETERS AND/OR HOMOGENEITY OF A SUSPENSION CONVEYED THROUGH A CHANNEL

(71) Applicant: Fraunhofer-Gesellschaft Zur Foerderung Der Angewandten Forschung E.V., Munich (DE)

(72) Inventors: Marcel Wild, Dresden (DE); Henning Heuer, Dresden (DE); Martin Schulze, Dresden (DE); Thomas Herzog, Dresden (DE)

(73) Assignee: FRAUNHOFER-GESELLSCHAFT ZUR FOERDERUNG DER ANGEWANDTEN FORSCHUNG E.V., Munich (GE)

( * ) Notice: Subject to any disclaimer, the term of this patent is extended or adjusted under 35 U.S.C. 154(b) by 309 days.

(21) Appl. No.: 17/432,292

(22) PCT Filed: Jan. 2, 2020

(86) PCT No.: PCT/EP2020/050035
§ 371 (c)(1),
(2) Date: Aug. 19, 2021

(87) PCT Pub. No.: WO2020/177932
PCT Pub. Date: Sep. 10, 2020

(65) Prior Publication Data
US 2022/0128510 A1 Apr. 28, 2022

(30) Foreign Application Priority Data
Mar. 1, 2019 (DE) .................... 10 2019 202 846.2

(51) Int. Cl.
*G01N 27/904* (2021.01)
*G01N 29/04* (2006.01)

(52) U.S. Cl.
CPC .......... *G01N 27/904* (2013.01); *G01N 29/04* (2013.01)

(58) Field of Classification Search
None
See application file for complete search history.

(56) References Cited

U.S. PATENT DOCUMENTS 4,955,235 A    9/1990  Metala et al.
5,333,502 A    8/1994  Clark, Jr. et al.
(Continued)

FOREIGN PATENT DOCUMENTS

DE    34 38 798    4/1986
DE    43 20 039    12/1994
(Continued)

OTHER PUBLICATIONS

International Search Report.

*Primary Examiner* — Jas A Sanghera
(74) *Attorney, Agent, or Firm* — Jacobson Holman PLLC

(57) ABSTRACT

A measuring system for monitoring the material parameters and/or homogeneity of a suspension which is conveyed through a channel, is electrically conductive or contains electrically conductive components with which an electrode of an electrical storage battery or electrical energy store is formed. A sensor system designed for ultrasonic inspection, which has at least one ultrasonic transducer, which is arranged on the outer wall of the channel in order to emit sound waves, and a sensor system designed for eddy current detection is provided, formed with at least one electrical transmitting coil and at least one electrical receiving coil or a giant magnetoresistive sensor (GMR), anisotropic magnetoresistive sensor (AMR), superconducting quantum interference sensor (SQUID) or Hall sensor and is arranged upstream or downstream of the sensor system.

7 Claims, 3 Drawing Sheets

(56) References Cited

U.S. PATENT DOCUMENTS

| | | | | |
|---|---|---|---|---|
| 2006/0228495 A1* | 10/2006 | Lee | ................ | G01N 27/4075 |
| | | | | 427/561 |
| 2008/0150518 A1* | 6/2008 | Becker | ............... | G01N 33/2858 |
| | | | | 73/53.07 |
| 2011/0138928 A1 | 6/2011 | Xie et al. | | |
| 2012/0007596 A1* | 1/2012 | Hashimoto | ........ | G01N 27/9006 |
| | | | | 324/240 |
| 2012/0055239 A1* | 3/2012 | Sinha | ..................... | G01F 25/10 |
| | | | | 73/61.79 |
| 2012/0255360 A1* | 10/2012 | Tippit, Jr. | ............ | G01N 29/262 |
| | | | | 73/620 |
| 2016/0061640 A1* | 3/2016 | Joshi | ....................... | G01F 15/18 |
| | | | | 73/197 |

FOREIGN PATENT DOCUMENTS

| | | |
|---|---|---|
| DE | 10 2007 039 434 | 2/2009 |
| DE | 10 2014 005 430 | 10/2015 |
| DE | 10 2015 008 995 | 1/2017 |

* cited by examiner

MEASURING SYSTEM FOR MONITORING THE MATERIAL PARAMETERS AND/OR HOMOGENEITY OF A SUSPENSION CONVEYED THROUGH A CHANNEL

BACKGROUND OF THE INVENTION

The invention relates to a measuring system for monitoring the material parameters and/or homogeneity of a suspension conveyed through a channel. The suspension can be slurries and extrudates that are to be used for the manufacture of electrodes for electrical storage batteries or electrical energy stores (batteries).

Electromobility is, for instance, in particular in a rapid growth phase in the current state of the art. A wide spectrum of research and development has thus resulted in the field of storage batteries. The satisfaction of safety and quality standards is of high priority here.

The basic components of a storage battery are divided into an anode, cathode, electrolyte, and a separator. The anode material and cathode material are located on a carrier film. The material of the carrier film for an anode is typically copper and for a cathode aluminum. In the current prior art, the coating of the electrode material takes place by a film casting process on the surface of a carrier film. The electrode material has a high solvent proportion. The material is produced and conveyed using an extruder by an extrusion process that can be implemented with a considerably smaller solvent proportion. The electrode material is applied to the carrier film using a special tool.

Inhomogeneities in the material can occur during the extrusion process, whereby its properties and thus the later functionality of the storage battery is influenced. Too late an inspection and thus detection of such defects after the application results in the production of unusable material, whereby the economic viability and the environment are negatively influenced.

The current prior art does not enable a sufficiently exact inspection of the extruded material in the ongoing process. The inspection of the material currently takes place via a subsequent functional inspection of the already produced electrodes. The quality of the storage battery can thereby be determined with reference to reference values and empirical values. If the expected quality is not satisfied, subsequent inspections of the material have to take place. The manufacturing process is subsequently adapted. Electrode material is produced in parallel with the coating process and the subsequent functional inspection. This ensures a continuous process flow. The late defect recognition, whereby defective and unusable material is produced, is disadvantageous.

An inspection of the extruded electrode material using nondestructive inspection methods during the manufacturing process is not possible with the current prior art.

These problems also occur in the monitoring of the quality of other suspensions or extrudates.

SUMMARY OF THE INVENTION

It is therefore the object of the invention to provide possibilities for the monitoring of a suspension conveyed through a channel by which defects or deviations from a specific quality-dependent consistency can be recognized and, where necessary, compensated and/or material parameters can be determined before the completion of a product using the respective suspension.

In accordance with the invention, this object is achieved by a measuring system having the features of the claims.

The challenge comprises the development of a measuring system that records data with respect to the material properties. It is possible due to the simultaneous recording of eddy current signals and ultrasound signals by the measuring system to determine material properties of the respective conveyed, in particular extruded, suspension during its conveying. Electrodes for electrical storage batteries or electrical energy stores can be produced using the suspension.

The measuring system design is divided into an eddy current system measuring sensor system and an ultrasound measuring sensor system. These can be arranged or fixed together in a housing. A sensor system configured for the eddy current detection is used to determine the electrical, magnetic, and dielectric properties. A sensor system configured for ultrasound inspection is present for the determination of mechanical properties. An arrangement of these two sensor systems between the extruder and the connected nozzle is possible. The suspension is here conveyed as an extrudate through a channel that can then be configured as a measuring tube. The two sensor systems are in every case arranged after one another in the direction of movement of the suspension. The ultrasound sensor system can be arranged upstream or downstream of the eddy current sensor system in the direction of movement of the suspension.

No direct intervention in the process has to take place with either of the sensor systems. Compared with the prior material inspection, this inline inspection enables an immediate adaptation of the process parameters or an initiating of a production stop on a defective consistency of the suspension, in particular on inhomogeneities within a volume. The production of unusable material can thus be avoided. This produces improved economic viability and reduced environmental pollution.

A sensor system configured for eddy current detection can be formed with at least one electrical transmission coil and at least one electrical receiver coil or also with a giant magnetoresistive sensor (GMR), an anisotropic magnetoresistive sensor (AMR), a superconducting quantum interference sensor (SQUID), or a Hall sensor.

The forming of a magnetic field (primary field) by an electrical transmission coil flowed through by current causes eddy currents and displacement currents in a conductive measurement object. A second magnetic field (secondary field) is thereby formed as a consequence of electrical induction. The effect of the interactions of the two magnetic fields can be utilized in the eddy current process. The strength of the magnetic secondary field that is received by the receiver coil depends on the eddy current and on displacement losses in the measurement object, that is the suspension, that is located within the respective detection region during its conveying. This is defined by the electrical, magnetic, and dielectric properties of the suspension.

An absolute measurement or a difference measurement can furthermore also be implemented in the eddy current process. A defect/material change has an absolutely amplifying or attenuating effect in the absolute measurement. The difference measurement enables a direct recording of the error signal by compensation of the magnetic fields (primary and secondary fields). An absolute measurement and/or a difference measurement can be implemented with the invention described here. In the absolute measurement, the transmission coil and the receiver coil should be arranged in a common sensor module. The transmission coil should here be the electrical coil arranged outwardly and the receiver coil should be the inwardly arranged electrical coil. The electric voltage that has been induced in the respective receiver coil also includes the induced electrical coil voltage and interference signals, etc. in addition to the error signal voltage of interest (information on material changes, material composition, cracks, hollow spaces, material defects). This feature may cause that small material deviations cannot be recognized.

Two identical electrical absolute coils can be used as the transmission coil and receiver coil, that are oppositely electrically wired, in the difference measurement. This results in the compensation of the transmission field and reception field. The electrical receiver coil voltage is thus equal to zero at the start of the measurement or with a homogeneous suspension, in particular a homogeneous extrudate material. It is thereby possible to make small fluctuations of the consistency and thus small amplitude deflections detectable and evaluable since here only the error signal voltage is used that is measured as a result of inhomogeneities. Both implementation forms of an eddy current inspection can be realized in a mechanical free space of the sensor system.

The integration of the eddy current measurement process by a corresponding sensor system can be implemented via sensor modules. These can be fixed in the eddy current region within a housing that is arranged at or fastened to the respective channel. In this process, they can be sensor modules formed from a plurality of transmission and receiver coils. They contain a coil pair adapted to the respective inspection work and an interface to the electronic evaluation unit. The coil modules can here have a breach, in particular a bore, through which the respective channel or a measuring tube can be guided with a fit that is as exact as possible. An outer pass sensor can be attached in the region of the breach/bore. The use of sensor systems, preferably different sensor systems, that are configured for an eddy current measurement is possible by means of a generously dimensioned mechanical free space in the eddy current measurement range. An adaptation to different suspensions or suspension compositions can be achieved using a plurality of differently configured sensor modules in that a respective suitable sensor module is selected for the monitoring that where possible has the highest sensitivity for the respective suspension.

At least one transmission coil can also be formed or arranged around the channel periphery and a receiver coil in the interior of the transmission coil can be integrated in the channel wall, can be received in grooves at the outer wall of the channel, or can be arranged in the interior of the channel.

The nondestructive inspection and examination of the respective suspension, in particular with respect to its mechanical properties, can be carried out using the ultrasound method. The emission of sound waves can take place by means of radio frequency pulses. Pulse echo signals penetrate into the suspension material by the excitation by a pulse sound. Time of flight shifts and amplitude attenuations of the sound waves occur due to different material characteristics.

The reflection signals and transmission signals can be used for the evaluation.

If an ultrasonic transducer acts as a transmitter and a receiver, the reflection signals of the sound waves can be detected by the one ultrasonic transducer and can be evaluated if it has been switched over from a transmission mode into a reception mode. Two ultrasonic transducers are used for the analysis of transmission signals. In this process, one serves as a transmitter and the oppositely disposed ultrasonic transducer as a receiver of the sound wave signals. The invention enables the almost simultaneous recording of reflection signals and transmission signals. Due to inhomogeneity or to flaws in the suspension consistency, characteristics, and the direction of the transmission sound pulse changes in comparison with detected sound measurement signals that are representative for a correct suspension consistency. These changed measurement signals can deliver a statement on the material properties.

The adaptation of the ultrasonic transducers into the sensor system should take place in the region of the ultrasound measurement region. The outer dimensions of the channel, in particular the outer radius of a measuring tube, in this region can be concave or flattened, that is planar, for an improved coupling. A good coupling and uncoupling can be achieved by planoparallel surfaces between the ultrasonic transducer and the outer channel wall.

If the surface(s) of the ultrasonic transducer(s) via which the sound waves are emitted and detected are concavely arched and if the outer channel wall is convexly arched in a complementary manner thereto in the region in which an ultrasonic transducer is arranged, a focusing of the sound waves can be achieved that can result in an increase of the measurement sensitivity.

Due to the necessity of a coupling medium for the coupling of the ultrasound, a closed region should be provided at a housing in which the ultrasonic transducer(s) is/are arranged and held.

The measurement system in accordance with the invention can be arranged at the output of an extruder while using said properties. The electrical and mechanical properties of a suspension as an extrudate can thereby be monitored during the manufacturing process. One exemplary application is the manufacture of battery electrodes. They comprise an electrically conductive carrier film having applied electrode material. An extruder can be used to produce such an electrode material. The aim of the extrusion process is the homogenization and dispersal of the components by which the extrudate, as an example for a suspension, can be monitored. The inspection process plays a crucial role in satisfying quality and safety standards of the storage batteries produced therewith. This can be carried out by the invention. It is thus made possible to carry out a material characterization from the combined application of the ultrasound process and the eddy current process. Conclusions can be drawn on the electrical and mechanical properties and on the homogeneity using this procedure. The evaluation of the detected measurement signals can take place using electromagnetic and acoustic impedance spectroscopy. This type of spectroscopy is directed to the breakdown of signals into their component parts. Significant regions in which a differentiation is possible can be selected for the evaluation of the signals. Regions in which a specific predefinable exceeding and/or falling below of a threshold value that can likewise be predefined for the respective suspension can thus be selected within a likewise predefinable time interval for an evaluation, for example.

DESCRIPTION OF THE DRAWINGS

The invention will be explained in more detail by way of example in the following.

There are shown.

DETAILED DESCRIPTION OF THE INVENTION

Figure 1:
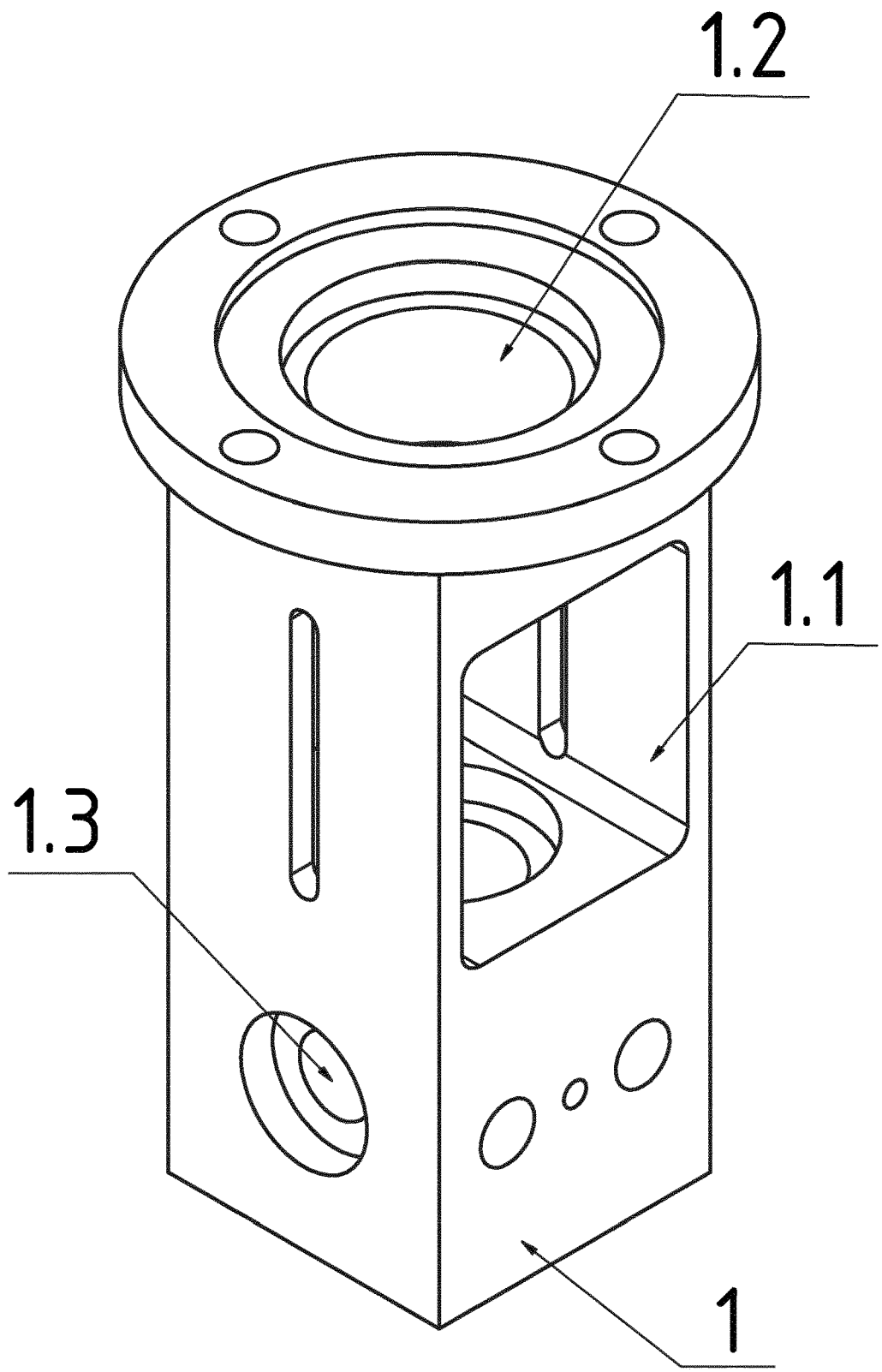
FIG. 1 an example of a housing for receiving and fastening the two sensor systems at a measurement tube as an example for a channel.
Figure 2:
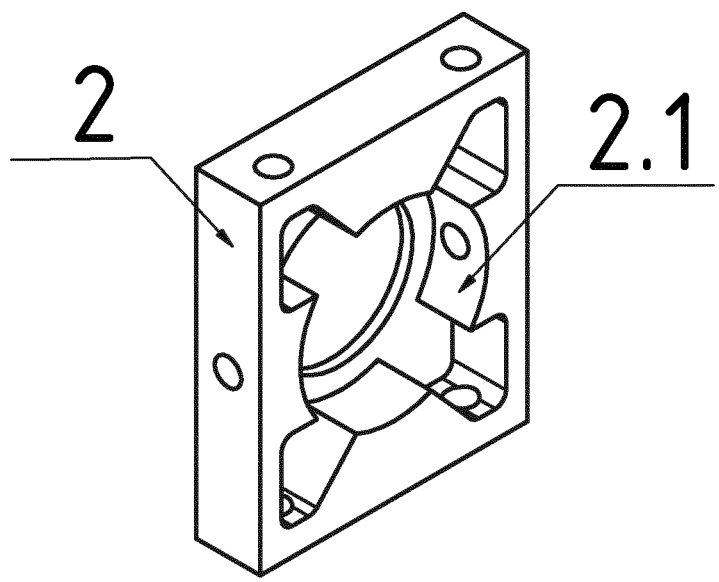
FIG. 2 an example for a housing part for receiving a sensor module for a sensor system that is configured for eddy current detection.
Figure 3:
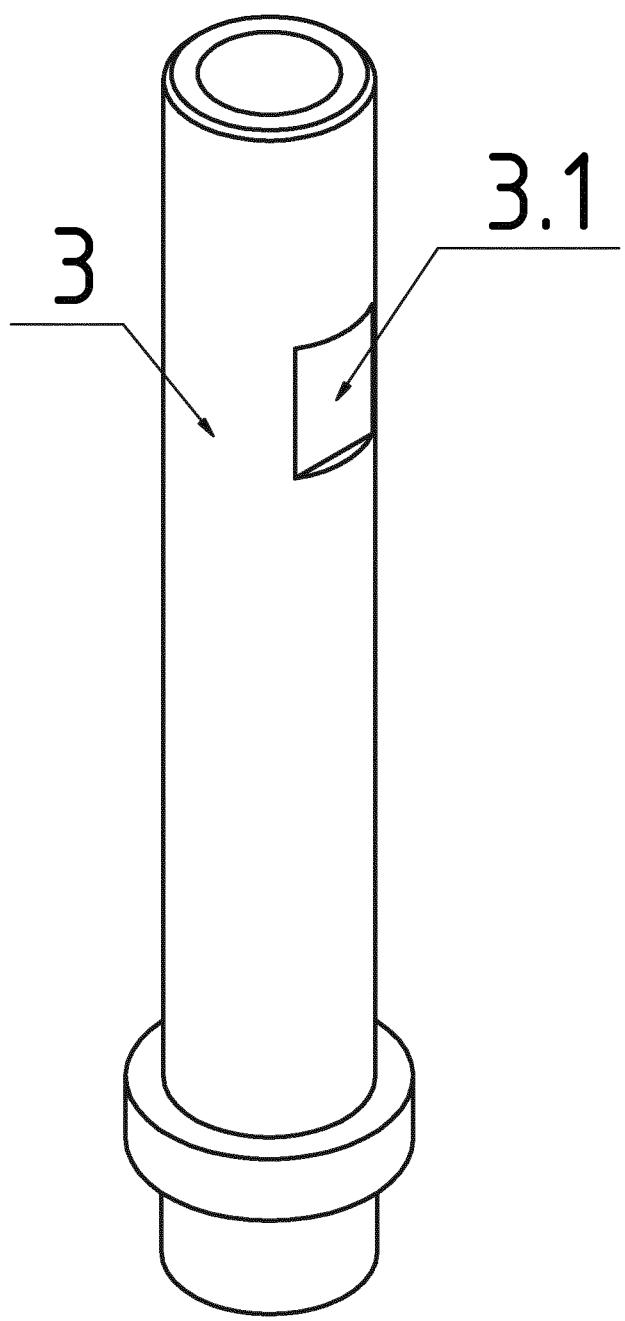
FIG. 3 a measurement tube.

The arrangement of a measuring system takes place at the output of an extruder by which a suspension that is provided for the formation of electrodes of an electrical energy store can be conveyed through a measurement tube 3 as an example for a channel. The measuring system is here fastenable to a channel that is arranged between the extruder output and the output of the channel that is as a rule a discharge nozzle. The material/extrudate should be checked for its homogeneity in this region. All the tools of the extruder can be connected downstream of the measuring system arranged there in the conveying direction. In the specific case of manufacturing battery electrodes, electrode films are formed by a flat film extrusion die.

The processed electrode material comprises active material, conductive carbon black, binders, and solvents. A solid content between 80 mass % and 90 mass % results from this in dependence on the composition. Electrodes in the form of films that are applied to carrier films and that have a thickness in the range of 100 µm to 600 µm are formed in the green state using a flat film extrusion die.

A measuring system having combined ultrasound and eddy current sensor systems is constructed to implement the material characterization in the extrusion process. This enables the monitoring of a wide spectrum of characteristics of the electrode material conveyed to the discharge nozzle by means of the extruder. The extrusion process should be influenced as little as possible on the integration of the measuring system. The measurement distance is short for this reason.

An adaptation of the flow channel to the extruder output took place. A replaceable measurement tube 3 is provided for this purpose as an example for a channel that can be adapted to the respectively used sensor systems (ultrasound and eddy current). Due to the replaceability, the material of the measurement tube 3 can be adapted to the respective application, which can relate to the mechanical, electrical, magnetic, and/or acoustic properties. The ultrasound and eddy current sensor systems were designed with adapted geometries. This construction can be seen from the following paragraphs.

The sensor system that is used for the ultrasound measurement uses two ultrasonic transducers in this example that are arranged diametrically opposite. This enables the recording of reflection signals and transmission signals of sound waves. Oil is used as the coupling medium between the ultrasonic transducers and the outer wall of the measurement tube 3. This requires a mechanical separation of the measurement region. The sealing can be implemented by shaft seals. Planar surfaces 3.1 are formed in the ultrasound measurement region on the measurement tube 3 to obtain parallel surfaces between the ultrasonic transducer and the measurement tube surface in the coupling region of the ultrasonic transducers. This is directed to a reduced change of the wave propagation direction in the medium. Ultrasonic transducers of contact technology and immersion technology can be used. Suitable frequencies of the ultrasonic transducers can be selected in dependence on the application area. In the application in the area of battery electrode manufacture, ultrasound inspection heads are suitable having resonant frequencies in the range from 1 MHz to 4 MHz for a monitoring of the homogeneity of the extruded electrode material. The ultrasonic transducers are in contact with the outer surface of the measurement tube 3 at the planar surfaces 3.1 during the measurement. Only the coupling medium is present between the surfaces of the measurement tube 3 and the sensitive surfaces of the ultrasonic transducers. This position has to be checked before every application to avoid energy losses of the emitted and detected sound waves in too large a gap between the ultrasonic transducer and the planar surface 3.1 of the measurement tube 3. The reflection signals and transmission signals are used for the evaluation. The recording of the signals should take place approximately simultaneously by a pulsed operation in the emission of sound waves. An oscillation movement takes place by the piezoelectric effect at an ultrasonic transducer with mechanical waves that are emitted as sound waves through the wall of the measurement tube 3 and the extrudate that is conveyed through the measurement tube 3. Sound waves emitted through the measurement tube wall and the extrudate can be detected in transmission by an ultrasonic transducer that is arranged diametrically opposite the emitting ultrasonic transducer. Sound waves reflected at the measurement tube wall can be detected by the emitting ultrasonic transducer in breaks in which no sound wave emission by it takes place. Backscatter information can be detected in this reception mode.

A sufficient mechanical free space is provided in the housing 1 that can be fastened to the measurement tube 3 for the reception of a measuring system in accordance with the invention to implement an eddy current sensor system. This allows the integration of different electrical coil systems as sensor modules that are configured for eddy current detection. Through-coils are used in this sensor system. This means that the electrical transmission coils and receiver coils used here surround the measurement tube 3. They have an inner diameter of approximately 28.1 mm and an outer diameter, in dependence on the number of windings, of 29.5 mm to 33.5 mm. Copper wire having a diameter of 250 µm is used as the coil wire in this specific application case of battery electrode manufacture. The number of windings of the individual coils varies here from 25 n to 200 n. Inductances in the range of 25 µH to 200 µH are currently reached. The filler content of the electrical coils plays an important role in eddy current technology so that the distance between the inner diameter of the electrical receiver coil and the outer diameter of the measurement tube 3 should be as small as possible. The electrical coils are used in the form of especially produced sensor modules for the instrumentation and protection of said electrical coils. A transmission coil and a receiver coil can be received in a housing part 2 here. An opening is formed for this purpose at a side of the housing part 2 in the form of a cutout 2.1 and a transmission coil and a receiver coil can be inserted into it with as exact a fit as possible. Corresponding free and bores through which electrical lines are guided to the two electrical coils for the electrical contacting of the two electrical coils spaces are formed in the region of the cut-out 2.1. The respective transmission coil is here connected to a frequency generator and the receiver coil to a measuring device for determining the complex receiver coil impedance (eddy current measurement device) that can be components of an electronic evaluation unit (neither shown).

One or more sensor modules can then be inserted in a correspondingly dimensioned free space 1.1 of the housing 1 and can be fixed therein. A plurality of sensor modules can here be arranged after one another in the conveying direction of the electrode material in respective parallel alignments with one another. Like sensor modules can thus each be arranged in this manner. Differently configured sensor modules can, however, also be arranged in this manner.

The measurement tube 3 can be introduced through bores 1.2 in the housing 1. The sensor modules are dimensioned such that the measurement tube 3 can likewise be guided through the sensor module(s).

In a form not shown, at least one receiver coil can also be embedded in the measurement tube wall or inserted in grooves that are formed in the outer wall of the measurement tube 3. A receiver coil can then be inserted into a housing part 2 in a sensor module.

The eddy current technology uses a transmission coil and a receiver coil for the examination of materials. The positioning of these two coils with respect to one another is freely selectable in principle and thereby enables a high flexibility in the development of an eddy current sensor system. A distinction can be made between an absolute system and a difference system here. In the absolute system, the transmission coil and the receiver coil can be located in one sensor module. The transmission coil is the outwardly arranged electrical coil and the receiver coil is the inwardly arranged electrical coil. In an absolute system, a material change of the extrudate has an absolutely amplifying or attenuating effect. The recorded electric voltage at the receiver coil also includes the induced electrical coil voltage and interference signals, etc. in addition to the error signal voltage of interest (information on material changes, cracks, hollow spaces, material defects). These properties can have the result that small material fluctuations are not easily recognizable. The difference system uses two identical electrical absolute coils that are oppositely connected electrically. This results in the compensation of the electromagnetic fields. The electrical receiver coil voltage is thus equal to zero at the start of the measurement or with a homogeneous extrudate material. It is thereby possible to make small material fluctuations and so small amplitude deflections detectable since here only the electrical error signal voltage is measured. Both systems can be implemented in a mechanical free space as a cutout 2.1 in a housing part 2. A frequency sweep that covers the range from 10 kHz go 100 MHz is used for the evaluation of the signals. A real part, an imaginary part, and an amount of the impedance over time are detected here. The signals in the region of a significant peaks (amplitude values) or on an exceeding of a tolerance limit are looked at in more detail for the analysis. These regions indicate changes such as inhomogeneities, particle shape change, particle size change, pressure changes, or other interference influences.

Two bores 1.3 arranged diametrically opposite are present at the housing 1 and a respective ultrasonic transducer, not shown, can be introduced and fixed into them with an exact fit such that the respective active and sensitive surface comes into touching contact with one of the planar surfaces 3.1 that are present at the measurement tube 3 and only a coupling medium is present between these surfaces and the respective planar surface 3.1.

The invention claimed is:

1. A measuring system for monitoring the material parameters and homogeneity of a suspension that is conveyed through a channel, that is electrically conductive or comprises electrically conductive components, and by which an electrode of an electrical storage battery or electrical energy store is configured;
   a sensor system configured for an ultrasound inspection has at least one ultrasonic transducer that is arranged at an outer wall of the channel for the emission of sound waves; and
   a sensor system that is configured for eddy current detection and that is formed with at least one electrical transmission coil and at least one electrical receiver coil or with a giant magnetoresistive sensor (GMR), an anisotropic magnetoresistive sensor (AMR), a superconducting quantum interference sensor (SQUID), or a Hall sensor is arranged upstream or downstream of the sensor system configured for ultrasound inspection in direction of movement of suspension; and
   both sensor systems are arranged between an extruder and a nozzle connected at the channel, through which the suspension as an extrudate will be extracted and
   the sensor system configured for the ultrasound inspection and the sensor system configured for the eddy current detection are connected to an electronic evaluation unit and the electronic evaluation unit is configured to recognize flaws in the material parameters and homogeneity of the conveyed suspension by means of the measurement signals detected by both sensor systems.

2. The measuring system in accordance with claim 1, wherein a second ultrasonic transducer of the sensor system configured for the ultrasound inspection is arranged at one outer channel wall diametrically opposite an other ultrasonic transducer.

3. The measuring system in accordance with claim 1, wherein the at least one ultrasonic transducer has a concavely arched surface that is arranged contacting a correspondingly convexly arched surface of the channel; or
   a planar surface of the at least one ultrasonic transducer is arranged at a planar surface at the outer wall of the channel.

4. The measuring system in accordance with claim 1, wherein the at least one electrical transmission coil and the at least one electrical receiver coil form a sensor module that is configured for eddy current detection.

5. The measuring system in accordance with claim 1, wherein a plurality of transmission and receiver coil pairs form at least one sensor module that is configured for eddy current detection, with the sensor modules being replaceably arranged in a housing and/or being alternatingly operable.

6. The measuring system in accordance with claim 1, wherein at least one electrical transmission coil is formed or arranged around the channel; and
   a receiver coil in the interior of the at least one electrical transmission coil is integrated in the channel, is received in grooves at the outer wall of the channel, or is arranged in the channel.

7. The measuring system in accordance with claim 1, wherein the sensor system or systems that is/are configured for eddy current detection is/are configured for carrying out an absolute measurement and/or a difference measurement.

* * * * *